(12) United States Patent
Thuerk et al.

(10) Patent No.: US 8,409,302 B2
(45) Date of Patent: Apr. 2, 2013

(54) SCENTED LIGHTER FLUID

(75) Inventors: Jeremy A. Thuerk, Pleasanton, CA (US); Kevin M. Barry, Pleasanton, CA (US); Tarric M. El-Sayed, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 207 days.

(21) Appl. No.: 13/050,714

(22) Filed: Mar. 17, 2011

(65) Prior Publication Data

US 2012/0234216 A1   Sep. 20, 2012

(51) Int. Cl.
  *C10L 1/10*  (2006.01)
(52) U.S. Cl. .......................................... 44/300
(58) Field of Classification Search ............. 44/300
  See application file for complete search history.

(56) References Cited

U.S. PATENT DOCUMENTS

| | | |
|---|---|---|
| 3,480,446 A | 11/1969 | Hollenbeck |
| 3,709,700 A | 1/1973 | Ross |
| 4,384,008 A | 5/1983 | Millisor |
| 4,533,487 A | 8/1985 | Jones |
| 4,857,074 A * | 8/1989 | Crace ............................ 44/540 |
| 4,874,396 A * | 10/1989 | McLeod ......................... 44/589 |
| 4,876,108 A | 10/1989 | Underwood et al. |
| 4,960,438 A | 10/1990 | Benesh et al. |
| 4,994,297 A | 2/1991 | Underwood et al. |
| 5,135,770 A | 8/1992 | Underwood |
| 5,252,107 A | 10/1993 | Wilkins, Jr. |
| 5,637,339 A | 6/1997 | Moeller |
| 5,681,603 A | 10/1997 | Underwood |
| 5,840,362 A | 11/1998 | Underwood et al. |
| 6,214,395 B1 | 4/2001 | Moeller et al. |
| 6,261,623 B1 | 7/2001 | Moeller |
| 6,843,812 B2 | 1/2005 | Stephanos |
| 7,244,461 B2 | 7/2007 | Plaschke |
| 7,632,318 B2 | 12/2009 | Stephanos |
| 7,694,626 B2 | 4/2010 | Davis |
| 7,758,907 B2 | 7/2010 | Holzschuh et al. |
| 2004/0096568 A1 | 5/2004 | Holzshuh et al. |
| 2006/0042618 A1 | 3/2006 | Gonzalez |
| 2008/0134572 A1 | 6/2008 | Cui |
| 2008/0138496 A1 | 6/2008 | Plaschke |

FOREIGN PATENT DOCUMENTS

EP          1753308 B1       2/2007

* cited by examiner

*Primary Examiner* — Cephia D Toomer
(74) *Attorney, Agent, or Firm* — Ann Lee

(57) ABSTRACT

Lighter fluid having a smoky aroma can be prepared by combining liquid smoke with aliphatic petroleum solvent. The smoke-scented lighter fluid imparts a pleasant scent while it is applied to charcoal briquets and ignited.

5 Claims, No Drawings

SCENTED LIGHTER FLUID

BACKGROUND OF THE INVENTION

1. The Field of the Invention

The present invention relates to flammable petroleum-based materials used to ignite charcoal fuel heating materials. Specifically, the invention relates to flammable petroleum-based materials having a smoke scent.

2. Background and Relevant Art

Charcoal heating materials, such as charcoal briquettes, are commonly used for cooking food. Foods cooked with charcoal can have a unique flavor and have wide appeal. Conventional charcoal briquettes generally provide a slow-burning fuel with a high BTU output. In particular, the dense structure and low porosity of conventional charcoal briquettes allow the charcoal to burn slowly for an extended period of time.

One of the shortcomings of conventional charcoal briquettes is that the briquettes can be difficult to ignite and may not continue to burn, even after they appear to have been ignited. To address this problem, conventional charcoal manufacturers often spray the briquettes with a petroleum solvent to create "easy-to-light" briquettes. More commonly, a consumer will use lighter fluid to ignite the briquettes. Excess use of such flammable petroleum-based materials, however, may impart unwanted odors to the air.

Accordingly, there is a need for a flammable petroleum-based material that doesn't releases unwanted odors when used to light conventional charcoal briquettes.

BRIEF SUMMARY OF THE INVENTION

One embodiment of the invention is directed to a composition prepared by combining aliphatic hydrocarbon solvent and aqueous liquid smoke, agitating the mixture and removing the organic phase from the aqueous phase to form a smoke-scented composition that is suitable for use as a lighter fluid.

Another embodiment of the invention is directed to a composition prepared by combining aliphatic hydrocarbon solvent and aqueous liquid smoke and agitating the mixture to form a smoke-scented composition that is suitable for use as a lighter fluid.

A third embodiment of the invention is directed to a composition prepared by combining aliphatic hydrocarbon solvent and an oil-based liquid smoke.

Additional features and advantages of exemplary implementations of the present invention will be set forth in the description which follows, and in part will be evident from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

DETAILED DESCRIPTION OF THE PREFERRED EMBODIMENTS

Before describing embodiments of the present invention in detail, it is to be understood that all publications, patents and patent applications cited herein, whether supra or infra, are hereby incorporated by reference in their entirety to the same extent as if each individual publication, patent or patent application was specifically and individually indicated to be incorporated by reference in their entirety.

It must be noted that, as used in this specification and the appended claims, the singular forms "a," "an" and "the" include plural referents unless the content clearly dictates otherwise. Thus, for example, reference to an "additive" includes two or more such additives.

Unless defined otherwise, all technical and scientific terms used herein have the same meaning as commonly understood by one of ordinary skill in the art to which the invention pertains. Unless otherwise stated, amounts listed in percentage ("%'s" are in weight percent.

The leading lighter fluid on the market, Kingsford® Lighter Fluid, is a colorless liquid that comprises aliphatic petroleum solvent. The term aliphatic petroleum solvent as used herein means a blend of 6-20 carbon chain length molecules, which may include straight chains, branched chains and rings that contain a very low level of aromatic compounds. Even given the low level of aromatic compounds, some consumers associate the use of lighter fluid with releasing an unpleasant hydrocarbon odor into the air when applied to charcoal briquets. Embodiments of the lighter fluid composition of the invention, when used for barbecues and cooking fires, are designed to avoid releasing unpleasant hydrocarbon odors into the air.

The combustible materials used in embodiments of the invention are aliphatic petroleum solvents. To mask the unwanted odor associated with the use of aliphatic petroleum solvents, the inventors have incorporated a small amount of aromatic phenol compounds that smell like BBQ wood smoke, wood BBQ or savory scents and smells, such as without limitation herbs, garlic, savory, spicy and citrus. Smoke-scented aromatic phenols can be incorporated into the aliphatic petroleum solvents by adding aqueous or oil-based liquid smoke, liquid smoke tar, phenols extracted from liquid smoke by an absorptive media, or a blend of chemicals designed to smell like liquid smoke to the aliphatic petroleum solvents.

The smoke-scented aromatic phenols can be from one or a combination of hardwood or softwood tree species. Some examples include, Hickory, Mesquite, Apple, Pecan, Maple, Oak, Alder, Walnut, Cherry, Fir, Pine, and Grape. The smoky wood aroma provided by the phenol compounds smells pleasing to the consumer during the lighter fluid application process and continues to impart a pleasant experience during ignition by also covering up the unpleasant hydrocarbon odor in the air that some associate with the use of lighter fluid.

In another embodiment of the invention, a small amount of aromatic phenol compounds that smell like BBQ wood smoke, wood BBQ or savory scents and smells, such as without limitation herbs, garlic, savory, spicy, and citrus could be added to the aliphatic petroleum solvent used to make instant light briquets. In similar fashion to the to the lighter fluid embodiment described above, the addition of, for example, liquid smoke to instant light briquets can add a smoky BBQ wood scent to cover up the hydrocarbon odor in the air experienced by some consumers when using instant light briquets.

The inventors have found that adding liquid smoke, aqueous or oil based, anywhere from 0.1-15 wt % to aliphatic petroleum solvent produces a product that has the scent of liquid smoke. If aqueous liquid smoke is added to the aliphatic petroleum solvent, it exists as a separate phase residing at the bottom of the container. Nonetheless, if a sample of the organic phase, i.e., the phase containing the aliphatic petroleum solvent, is drawn off, it has a smoky aroma and a slightly brownish-yellow color. This suggests that the some of the phenol compounds migrate into the organic phase of the mixture.

The inventors have found that aqueous liquid smoke could merely be exposed to the aliphatic petroleum solvent for a brief period of time (a few seconds to a few minutes) to allow the solvent to dissolve some of the components contained in the aqueous liquid smoke. Once the phase containing the aqueous liquid smoke is removed, the solvent retains some of the color and scent of the liquid smoke. Thus, a uniform lighter fluid composition can be formulated to contain the attributes of the aqueous liquid smoke.

The following specific examples describe compositions and preparation methods of some of the presently preferred embodiments of the invention. Variations on the following examples will suggest themselves to those skilled in the art upon review of this disclosure, and such variations are considered to be within the scope of this disclosure. Thus, the particular details in the examples below are only exemplary, and should not be considered limiting.

Charsol H-10 Hickory liquid smoke (hereinafter referred to "Hickory liquid smoke") and Charsol M-10 Mesquite liquid smoke (hereinafter referred to "Mesquite liquid smoke") used in the specific examples below are commercially available from Red Arrow of Manitowoc, Wis. and were used as received. Other suitable liquid smoke compounds include Charoil Hickory, Charoil Mesquite, and Charoil B from Red Arrow; Hickory 10 and Mesquite 10 from Kerry Ingredients; and oil-based compound blends available from Symrise. The aliphatic petroleum solvent used in the specific examples below was Kingsford® Lighter Fluid (hereinafter referred to as "lighter fluid"), commercially available from numerous retail outlets and used as received. The Hickory and Mesquite liquid smoke products were mixed with the lighter fluid at concentrations having the following weight percentages: 0.5, 1, 2.5 and 5 as reported in Table 1 below.

The samples were prepared by adding the designated amount of liquid smoke to the lighter fluid and agitating the mixture by shaking. The mixture comprised two phases; an aqueous phase containing the liquid smoke and an organic phase containing the lighter fluid. Very small droplets of the aqueous phase were dispersed into the organic phase. These droplets quickly coalesced back into a uniform aqueous phase immediately after the agitation ceased. Despite this phase separation, all examples had a pleasing smoky aroma.

TABLE 1

| Example | liquid smoke flavor | % by wt. |
|---------|--------------------|---------| 
| A | Hickory | 0.5 |
| B | Hickory | 1 |
| C | Hickory | 2.5 |
| D | Hickory | 5 |
| E | Mesquite | 0.5 |
| F | Mesquite | 1 |
| G | Mesquite | 2.5 |
| H | Mesquite | 5 |

In Examples A-H, the smoky aroma masked the lighter fluid's original hydrocarbon scent. Higher concentrations of liquid smoke masked the lighter fluid odor better than lower concentrations. Upon addition of the liquid smoke, the lighter fluid became tinged a brownish-yellow color; the examples at higher concentration were tinged darker.

A portion of the organic phase of Example C was removed and placed in a jar (Example CC). After several days Example CC was re-evaluated. No aqueous phase was present and Example CC remained slightly tinged brownish-yellow in color and continued to exhibit a strong Hickory scent. Based on the foregoing, the inventors believe that despite not being miscible with aliphatic petroleum solvent, enough compounds from the liquid smoke are absorbed by the solvent to effectively modify the scent to produce a lighter fluid composition having a smoky aroma.

The method of using embodiments of the invention for igniting a barbecue or cooking fire comprises generally providing a lighter fluid composition having a smoky aroma as generally described in Example CC above, applying the composition to charcoal, and igniting the composition after it has been applied to the charcoal. The smoky aroma is observed during the application of the lighter fluid and the ignition of the briquets. The lighter fluid composition is allowed to undergo complete or substantially complete combustion to leave a bed of hot coals suitable for cooking.

The method of making the lighter fluid composition, as related in the above specific examples, generally comprises mixing the aqueous liquid smoke with aliphatic hydrocarbon solvent, shaking, separating and collecting the organic phase.

Embodiments of the invention include both a two-phase smoke-scented lighter fluid prepared by merely combining aliphatic petroleum solvent and aqueous liquid smoke and a one phase smoke-scented lighter fluid prepared by either combining aliphatic petroleum solvent and aqueous liquid smoke and separating the organic phase from the aqueous phase or by merely combining aliphatic petroleum solvent and oil-based liquid smoke.

Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A composition comprising:
   an organic extract prepared by
   (a) mixing 85-99.9% by weight aliphatic hydrocarbon solvent and 0.1-15% by weight aqueous liquid smoke to form a mixture,
   (b) shaking the mixture;
   (c) separating the organic phase from the aqueous phase to form a brownish-yellow, smoke-scented composition suitable for use as a lighter fluid.

2. A method of using the composition recited in claim 1 for igniting a barbecue or cooking fire comprising:
   providing a lighter fluid having a an organic extract prepared by (a) mixing 85-99.9% by weight aliphatic hydrocarbon solvent and 0.1-15% by weight aqueous liquid smoke to form a mixture, (b) shaking the mixture, (c) separating the organic phase from the aqueous phase to form a brownish-yellow, smoke-scented composition,
   applying the brownish-yellow, smoke-scented composition to charcoal, and
   igniting the brownish-yellow, smoke-scented composition after it has been applied to the charcoal.

3. A composition comprising 85-99.9% by weight aliphatic hydrocarbon solvent and 0.1-15% by weight liquid smoke to form a brownish-yellow, smoke-scented composition suitable for use as a lighter fluid.

4. The composition recited in claim 3 wherein the 0.1-15% by weight liquid smoke is aqueous liquid smoke.

5. The composition recited in claim 3 wherein the 0.1-15% by weight liquid smoke is oil-based liquid smoke.

* * * * *